United States Patent
Kato et al.

(10) Patent No.: US 7,496,476 B2
(45) Date of Patent: Feb. 24, 2009

(54) METHOD AND SYSTEM FOR ANALYZING PERFORMANCE OF AN INFORMATION PROCESSING SYSTEM

(75) Inventors: Sei Kato, Kanagawa-ken (JP); Takahide Nogayama, Kanagawa-ken (JP); Toshiyuki Yamane, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 11/739,730

(22) Filed: Apr. 25, 2007

(65) Prior Publication Data

US 2007/0288201 A1 Dec. 13, 2007

(30) Foreign Application Priority Data

May 16, 2006 (JP) .............................. 2006-136442

(51) Int. Cl.
G06F 15/00 (2006.01)
G06F 15/16 (2006.01)

(52) U.S. Cl. ........................................ 702/186; 709/230

(58) Field of Classification Search ................. 702/182, 702/186, 187; 709/230, 232
See application file for complete search history.

(56) References Cited

U.S. PATENT DOCUMENTS

2005/0125549 A1* 6/2005 Katayama .................... 709/230
2007/0260337 A1* 11/2007 Sugiyama .................... 700/40

FOREIGN PATENT DOCUMENTS

| JP | 06-110871 | 4/1994 |
|---|---|---|
| JP | 07-262055 | 10/1995 |
| JP | 09-311782 | 12/1997 |
| JP | 2005-216066 | 8/2002 |
| JP | 2002-268922 | 9/2002 |
| JP | 2004-021756 | 1/2004 |
| JP | 2004-348491 | 12/2004 |
| JP | 2005-190277 | 7/2005 |
| JP | 2006-024017 | 1/2006 |

OTHER PUBLICATIONS

Rolia, et al.; The Method of Layers; IEEE Transactions on Software Engineering, vol. 21, No. 8, Aug. 1995; pp. 689-700.

* cited by examiner

*Primary Examiner*—Bryan Bui
(74) *Attorney, Agent, or Firm*—Schmeiser, Olsen & Watts; Shimokaji & Associates, P.C.

(57) ABSTRACT

A method for analyzing performance of an information processing system having information processing apparatuses providing services to each other. Communication packets sent or received between the apparatuses are acquired. The apparatuses receive calls from other apparatuses for providing services indicated in the packets. A service call count $a_{ji}$ of the calls received by the apparatuses during period j of m periods for the service i of n services is computed. A busy time $b_j$ is computed by summing processing times by the apparatuses for performing the services pertaining to the calls received by the apparatuses during period j. An average processing time $d_i$ is computed by the apparatuses for each service i, as is an error $\epsilon_j$ in $d_i$ wherein $\epsilon_j = b_j - \Sigma_i a_{ji} d_i$, by minimizing an index indicative of $\epsilon_j$. The average processing time $d_i$ is stored in a storage device and/or displayed on a display device.

1 Claim, 6 Drawing Sheets

METHOD AND SYSTEM FOR ANALYZING PERFORMANCE OF AN INFORMATION PROCESSING SYSTEM

FIELD OF THE INVENTION

The present invention relates to a method and system for analyzing the performance of an information processing system, and more particularly, the present invention relates to a method and system for analyzing the performance of an information processing system having information processing apparatuses which provide services to each other.

BACKGROUND OF THE INVENTION

In recent years, an information processing system has been shifting from a conventional host system to a distributed system in which information processing apparatuses operate in cooperation with each other. According to the information processing system in such a distributed system, a certain information processing apparatus distributes a process to another information processing apparatus in response to a request from a user, and the other information processing apparatus executes the distributed process and sends the processed result to the user.

If the information processing system has a performance failure, it may be necessary to change a configuration of the system by adding a new information processing apparatus to the system. However, if the information processing system consists of a plurality of information processing apparatuses, it cannot be easily determined which type of new information processing apparatus should be added to the system. Conventionally, a performance evaluation model has been proposed in order to support such a determination. For example, see J. A. Rolia and K. C. Sevcik, "The method of layers", IEEE Transactions on Software Engineering, 21, 1995. A performance evaluation model may be a queueing model, a discrete event simulator, or the like having granularity of service level such as URL and SQL. In this way, it is possible to analyze behavior inside the information processing system.

A method for determining a configuration to be changed in a real information processing system may be considered by constructing a test system imitating the real information processing system and analyzing the behavior of the test system. However, since a real information processing system may be formed of several hundred of information processing apparatuses, a test system having the same magnitude as that of the information processing system may not be formed. In addition, a technique applicable to the test system refers to Japanese Patent Application Publications 2004-348491 and 1997-311782. Moreover, an engineer who has developed the information processing system may expect a service demand to some extent on the basis of experience in development. However, since an engineer developing the information processing system may be different from an engineer using and managing the information processing system, the engineer who has developed the information processing system cannot be involved in failure correspondence in many cases.

Thus, there is a need for a method and system that overcomes at least one of the aforementioned disadvantages of the prior art.

SUMMARY OF THE INVENTION

The present invention provides a method for analyzing performance of an information processing system having a plurality of information processing apparatuses providing services to each other, said method comprising:

acquiring a plurality of communication packets sent or received between the apparatuses during a specified analysis period, said apparatuses receiving calls from other apparatuses of the plurality of apparatuses for providing services indicated in the packets;

dividing the analysis period into m observation periods ($m \geq 2$);

computing a service call count $a_{ji}$ of the calls received by the apparatuses during observation period j for the service i of n services ($n \geq 2$; $i=1, 2, \ldots, n$; $j=1, 2, \ldots, m$);

computing a busy time $b_j$ by summing processing times by the plurality of apparatuses for performing the services pertaining to the calls received by the apparatuses during observation period j, for $j=1, 2, \ldots, m$;

computing an average processing time $d_i$ by the apparatuses for each service i, and an error $\epsilon_j$ in $d_i$ wherein $\epsilon_j = b_j - \Sigma_i a_{ji} d_i$, by minimizing an index indicative of $\epsilon_j$, for $j=1, 2, \ldots, m$, wherein $\Sigma_i$ represents a summation over i from $i=1$ to $i=n$; and storing $d_i$ in a storage device and/or displaying $d_i$ on a display device ($i=1, 2, \ldots, n$).

The present invention provides a computer program product, comprising a computer usable storage medium having a computer readable program code embodied therein, said computer readable program code containing program code that when executed by a processor of a computer system performs a method for analyzing performance of an information processing system having a plurality of information processing apparatuses providing services to each other, said method comprising:

acquiring a plurality of communication packets sent or received between the apparatuses during a specified analysis period, said apparatuses receiving calls from other apparatuses of the plurality of apparatuses for providing services indicated in the packets;

dividing the analysis period into m observation periods ($m \geq 2$);

computing a service call count $a_{ji}$ of the calls received by the apparatuses during observation period j for the service i of n services ($n \geq 2$; $i=1, 2, \ldots, n$; $j=1, 2, \ldots, m$);

computing a busy time $b_j$ by summing processing times by the plurality of apparatuses for performing the services pertaining to the calls received by the apparatuses during observation period j, for $j=1, 2, \ldots, m$;

computing an average processing time $d_{ji}$ by the apparatuses for each service i, and an error $\epsilon_j$ in $d_i$ wherein $\epsilon_j = b_j - \Sigma_i a_{ji} d_i$, by minimizing an index indicative of $\epsilon_j$, for $j=1, 2, \ldots, m$, wherein $\Sigma_i$ represents a summation over i from $i=1$ to $i=n$; and storing $d_i$ in a storage device and/or displaying $d_i$ for each service i ($i=1, 2, \ldots, n$) on a display device.

The present invention provides a computer system comprising a processor and a computer readable memory unit coupled to the processor, said memory unit containing program code that when executed by the processor performs a method for analyzing performance of an information processing system having a plurality of information processing apparatuses providing services to each other, said method comprising:

acquiring a plurality of communication packets sent or received between the apparatuses during a specified analysis period, said apparatuses receiving calls from other apparatuses of the plurality of apparatuses for providing services indicated in the packets;

dividing the analysis period into m observation periods (m≧2);

computing a service call count $a_{ji}$ of the calls received by the apparatuses during observation period j for the service i of n services (n≧2; i=1, 2, . . . , n; j=1, 2, . . . , m);

computing a busy time $b_j$ by summing processing times by the plurality of apparatuses for performing the services pertaining to the calls received by the apparatuses during observation period j, for j=1, 2, . . . , m;

computing an average processing time $d_i$ by the apparatuses for each service i, and an error $\epsilon_j$ in $d_i$ wherein $\epsilon_j=b_j-\Sigma_i a_{ji} d_i$, by minimizing an index indicative of $\epsilon_j$, for j=1, 2, . . . , m, wherein $\Sigma_i$ represents a summation over i from i=1 to i=n; and storing $d_i$ in a storage device and/or displaying $d_i$ on a display device (i=1, 2, . . . , m).

DETAILED DESCRIPTION OF THE INVENTION

The invention will now be described based on embodiments which do not intend to limit the scope of the present invention but exemplify the invention. All of the features and the combinations thereof described in the embodiment are not necessarily essential to the invention.

Figure 1:
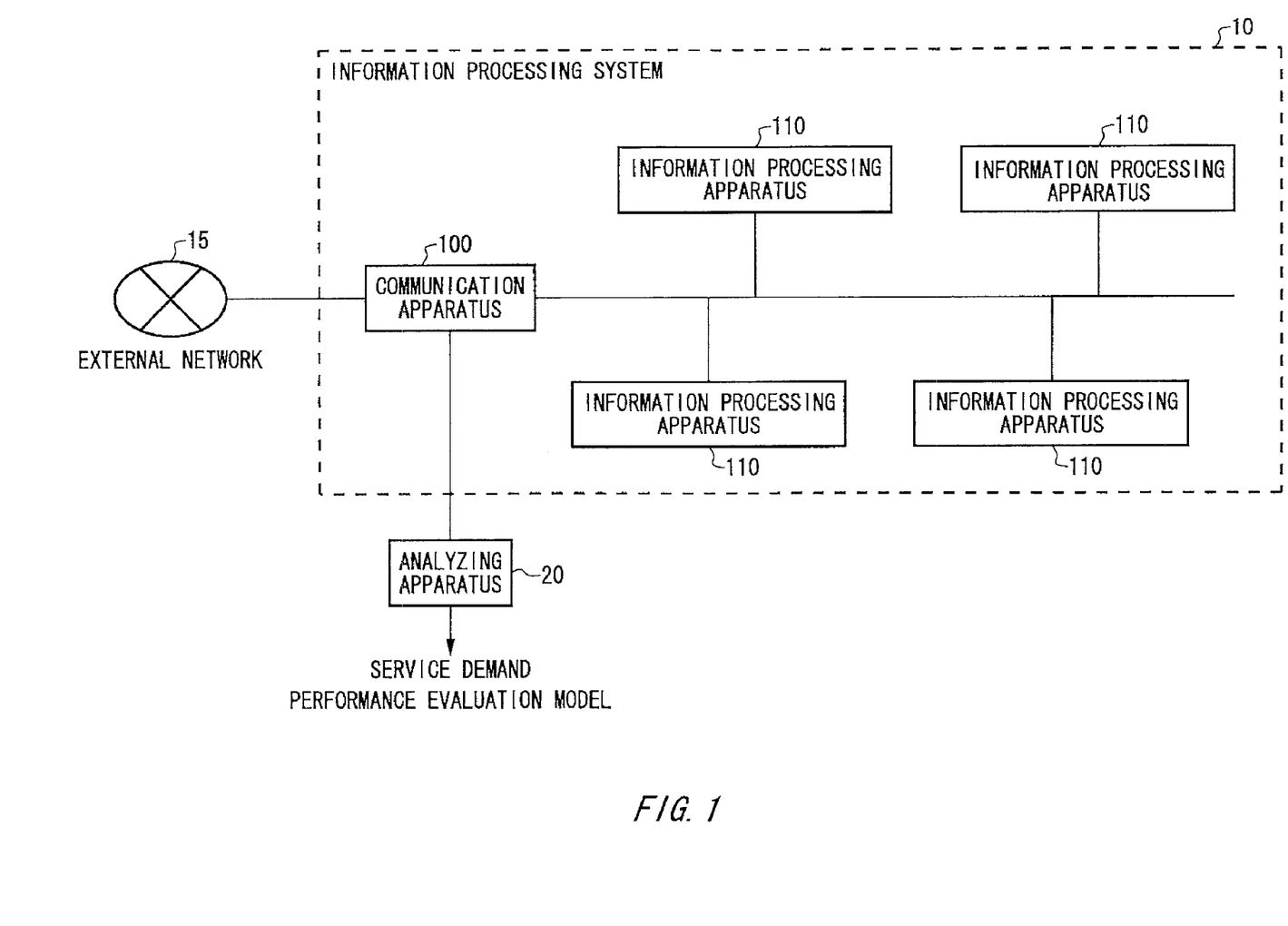
FIG. 1 is a view showing an entire configuration of an information processing system.

FIG. 1 is shows an entire configuration of an information processing system 10. The information processing system 10 is, e.g., a web system for sending back a web page in response to a request received from a computer on an external network 15. The information processing system 10 has a communication apparatus 100 and a plurality of information processing apparatuses 110, said apparatuses providing services to each other. The communication apparatus 100 is, e.g., a network switch, a gateway, a router, or the like, and sends a request received from the external network 15 to one of the information processing apparatuses 110. The plurality of information processing apparatuses 110 are respectively connected by a communication line for communicating with each other, and each information processing apparatus provides services to each of the other information processing apparatuses 110. For example, a certain information processing apparatus 110 functions as a web server that receives a request from the external network 15 and returns a transaction result according to the request to the external network 15. Moreover, another information processing apparatus 110 functions as an application server that performs a transaction according to the request received from the external network 15. Moreover, another information processing apparatus 110 functions as a database server that manages a database required for a transaction.

When the information processing system 10 has a performance failure, a configuration of the information processing system 10 should be changed in some cases. For example, when the information processing system 10 receives requests from the external network 15, the information processing apparatus 110 cannot completely process these requests and thus may generate a delayed answer. In this case, it may be desirable that a new information processing apparatus is added to the information processing system 10 in order to improve processing performance. However, it may be difficult to determine how a configuration of the information processing system 10 is changed.

An object of the analyzing apparatus 20 according to the present embodiment is to analyze the performance of the information processing system 10 and estimate a time required for processing a service by each of the information processing apparatuses 110 in order to support the determination of configuration change. Since the analyzing apparatus 20 uses copy data for a communication packet (i.e., a copy of the data comprised by the communication packet) acquired from the communication apparatus 100 in order to analyze performance, an operation of the information processing system 10 can be continued without having an influence on the operation during analyzing the performance.

Hereinafter, a function of the analyzing apparatus 20 will be described in an exemplary embodiment in which the information processing system 10 manages an online stock trade account.

Figure 2:
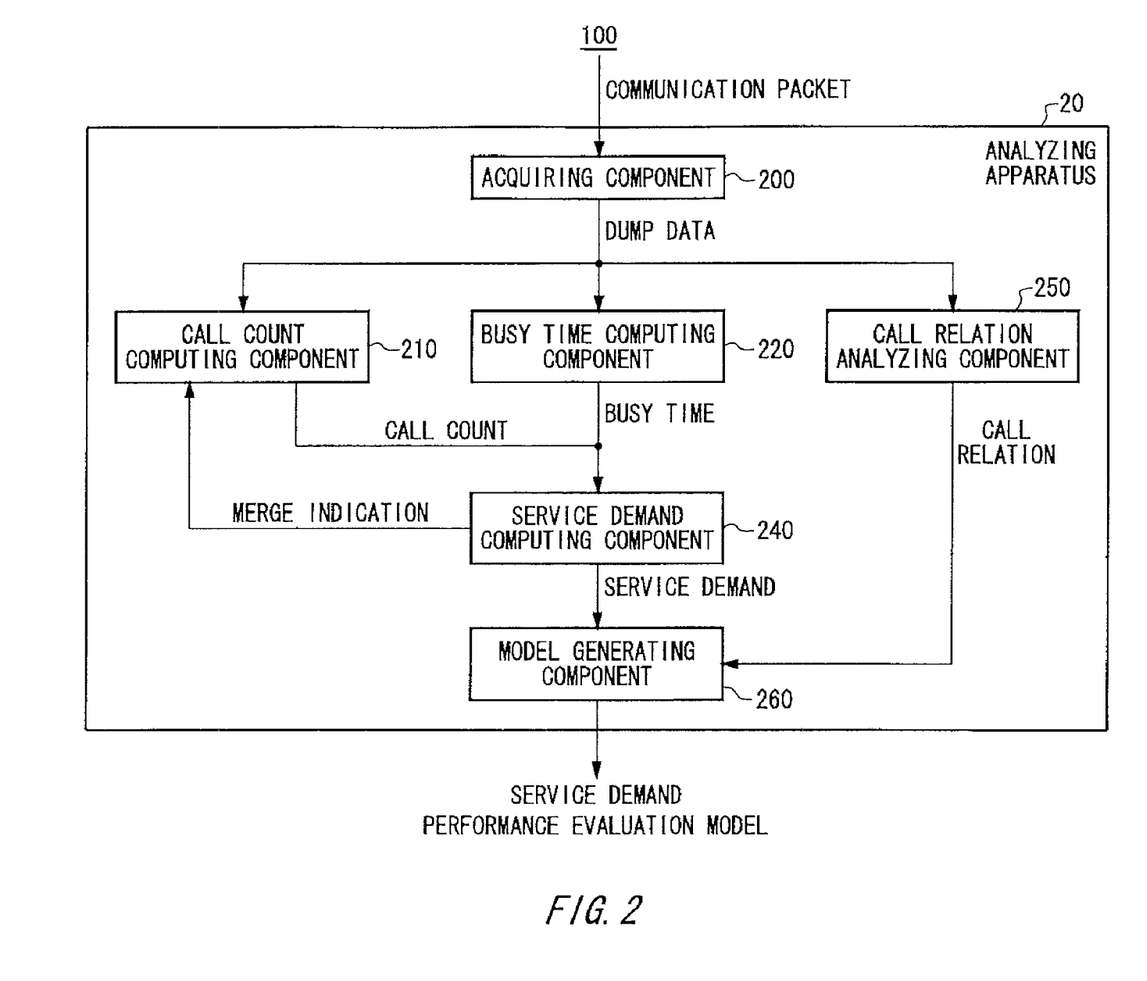
FIG. 2 is a view showing a functional configuration of an analyzing apparatus.

FIG. 2 shows a functional configuration of the analyzing apparatus 20. The analyzing apparatus 20 has an acquiring component 200, a call count computing component 210, a busy time computing component 220, a service demand computing component 240, a call relation analyzing component 250, and a model generating component 260. The acquiring component 200 acquires a plurality of communication packets mutually sent and received between the information processing apparatuses 110 within an analysis period predetermined as an object of analysis. Specifically, the acquiring component 200 acquires copy data for a communication packet transferred through a communication line from the communication apparatus 100 connected to the communication line. As an example, the acquiring component 200 may acquire copy data for a communication packet from a mirror port through which the communication apparatus 100 copies and outputs the communication packet on a Local Area Network (LAN) and execute a tcpdump command or the like of an UNIX® (a registered trademark) series operating system, in order to generate dump data of the copy data. Alternatively, the acquiring component 200 may acquire copy data for a communication packet from another network switch for interconnecting the plurality of information processing apparatuses 110 inside the LAN.

The call count computing component 210 computes, for each of a plurality of observation periods obtained by dividing the analysis period into the plurality of observation periods, service call counts by which each of the information processing apparatuses 110 is called from the other information processing apparatuses 110 on the basis of a communication packet acquired in the observation period. For example, the call count computing component 210 determines, for each of the observation periods, whether the communication packet acquired in the observation period is a communication packet for calling a service by means of destination Universal Resource Locator (URL) or identification information for the service included in the communication packet. For example, if a destination URL included in a certain communication packet is "http://www.ΔΔ.com/trade/app?action=login", the call count computing component 210 determines that the communication packet is a communication packet for calling a login service for a stock trade account. Moreover, if a destination URL included in another communication packet is "http://www.ΔΔ.com/trade/app?action=account", the call count computing component 210 determines that the communication packet is a communication packet for calling a service referring to content of a stock trade account. Then, the call count computing component 210 computes the number of communication packets for calling each service as call count for the service during each observation period. Alternatively, the call count computing component 210 may compute the number of communication packets returning the result for each service call as call count for each service during each observation period.

The busy time computing component 220 computes a busy time for each of the plurality of observation periods by summing transaction executing times performed by the information processing apparatuses 110 during each observation period. The term transaction denotes a process for each service. For example, the busy time computing component 220 determines, for each of the information processing apparatuses 110, that a period from acquiring a communication packet for calling a service for this information processing apparatus 110 to acquiring a communication packet through which a processing result for the service is returned from this information processing apparatus 110 is a time for which this information processing apparatus 110 processes a transaction. Then, the busy time computing component 220 computes the sum of the periods determined for the information processing apparatuses as the busy time.

In addition, in case that a call of one transaction is performed by a plurality of communication packets or in case that an answer of one transaction is performed by a plurality of communication packets, the busy time computing component 220 determines that a period from acquiring one communication packet selected among a plurality of communication packets for a call to acquiring one communication packet selected among a plurality of communication packets for an answer is a period for which a transaction is processed. This selection method depends on a kind of service and a type of reference for acquiring a busy time. For example, in case that a transaction process is started after receiving an initial communication packet for a call consisting of a plurality of communication packets, the process is also continued while sending a processing result consisting of the plurality of communication packets, and the process is completed after sending a final communication packet, the busy time computing component 220 determines that a period from acquiring an initial communication packet among the plurality of communication packets for calling a service to acquiring a final communication packet among the plurality of communication packets for returning the processing result for service is a period for which a transaction is processed.

In addition, a period for which a certain information processing apparatus 110 processes two or more transactions is also computed as a busy time. In order to realize this, the busy time computing component 220 may have a counter for counting the number of transactions being processed in the information processing apparatus 110 in association with each of the information processing apparatuses 110. In this case, the busy time computing component 220 increments a counter corresponding to a certain information processing apparatus 110 when acquiring a communication packet for calling a service for this information processing apparatus 110, and decrements the counter when acquiring a communication packet through which a processing result for the service is returned. Then, the busy time computing component 220 computes the sum of periods, in which the values of the counters corresponding to the information processing apparatuses 110 are respectively not less than one, as a busy time.

Moreover, in case that a certain transaction is a process waiting state for another transaction, a time of processing the transaction is excluded from the busy time. That is to say, the busy time computing component 220 determines, for each of the information processing apparatuses 110, that a period from acquiring a communication packet through which this information processing apparatus 110 calls another service for another information processing apparatus 110 to acquiring a communication packet through which the other information processing apparatus 110 returns a result for the other service to this information processing apparatus 110 is a period for which this information processing apparatus 110 does not process a transaction, even though the period is a period from acquiring a communication packet for calling a service for this information processing apparatus 110 to acquiring a communication packet through which a processing result for the service is returned from this information processing apparatus 110. In order to realize this, the busy time computing component 220 decrements a counter corresponding to a certain information processing apparatus 110 when acquiring a communication packet through which this information processing apparatus 110 calls a service for another information processing apparatus 110, and increments the counter when acquiring a communication packet through which a processing result for the service is returned. In this way, the sum of periods in which the values of the counters are not less than one can be used as a busy time.

The service demand computing component 240 computes an average processing time for each service (a service demand) on the basis of the busy time and the call count computed every observation period. In case that the busy time and the call count could be accurately computed, the sum of values obtained by respectively multiplying an average processing time for a transaction for processing each service by the call count for the service should be equal to a busy time for the observation period. For this reason, a service demand can be calculated by solving an equation showing a relationship between the busy time, the call count, and the processing time. However, since the computation of busy time and call count may have an error, a service demand cannot be computed accurately in many cases by means of solving this equation. To the contrary, the service demand computing component 240 according to the present embodiment computes a service demand minimizing an index indicative of the size of the difference between the busy time for each observation period and a sum of values obtained by multiplying the average processing time for a transaction processing of this service by the call count for each service in this observation period. For example, the service demand computing component 240 may generate a normal equation for calculating the average processing time minimizing the sum of squares of the difference in each observation period and compute the service demand by solving the normal equation. An index showing the size of difference may be a sum of absolute values for this difference instead of the sum of squares of this difference in each observation period. The operation for computing this index is expressed with a function that uses this difference in each observation period as an input.

The call relation analyzing component 250 analyzes call relations for each service. Call relations are waiting relations in a process waiting state until completing a transaction process for another service when the transaction process for the other service becomes necessary during processing a transaction for a certain service. For example, the call relation is that an access to a database server is requested during processing a certain application service. The call relation analyzing component 250 may analyze call relations on the basis of, e.g., dump data of a communication packet. As an example, the call relation analyzing component 250 may determine that a transaction that is started more first and is completed later is a parent transaction of a transaction that is started later and is completed first. Alternatively, call relations for a service may be previously given via input by an engineer or the like.

The model generating component 260 generates a performance evaluation model on the basis of the average processing time every service, call relations by which each of the information processing apparatuses 110 calls a service for each of the other information processing apparatuses 110, and information showing a predetermined configuration of the information processing system 10. Specifically, the model generating component 260 may generate input to a performance evaluation model by means of providing a service demand, configuration information of the information processing system 10, and call relations as a parameter to a hierarchical queuing network model or a discrete event simulator that is previously prepared. If using a performance evaluation model, it is possible to calculate how the performance of the information processing system is changed according to a configuration change of the information processing system 10.

Subsequently, referring to FIG. 3, a processing function for computing an average processing time every service will be described. It is desirable that a plurality of services is processed at various mixing ratios in order to compute a processing time for each service with high precision. However, the mixing ratio of service may not be changed if an analysis period is short. Therefore, it is possible to raise computation precision of a processing time if the processing time is computed after an adequately long analysis period is passed. On the other hand, if an analysis period is long, a data amount required for computation increases and the necessary capacitance of a storage device included in the analyzing apparatus 20 increases. For this reason, the service demand computing component 240 tries computing a service demand on the basis of a communication packet obtained in the observation period already passed, whenever each of the plurality of observation periods constituting the analysis period is passed. The service demand computing component 240 outputs a service demand if the computed service demand has adequately high accuracy, and repeats the same process whenever the subsequent observation period is passed if the service demand does not have adequately high accuracy. In this way, since data of an adequate amount required for the analyzing apparatus 20 may be stored, a time distance until computation is completed can be reduced. Hereinafter, this processing function will be described with reference to FIG. 3.

Figure 3:
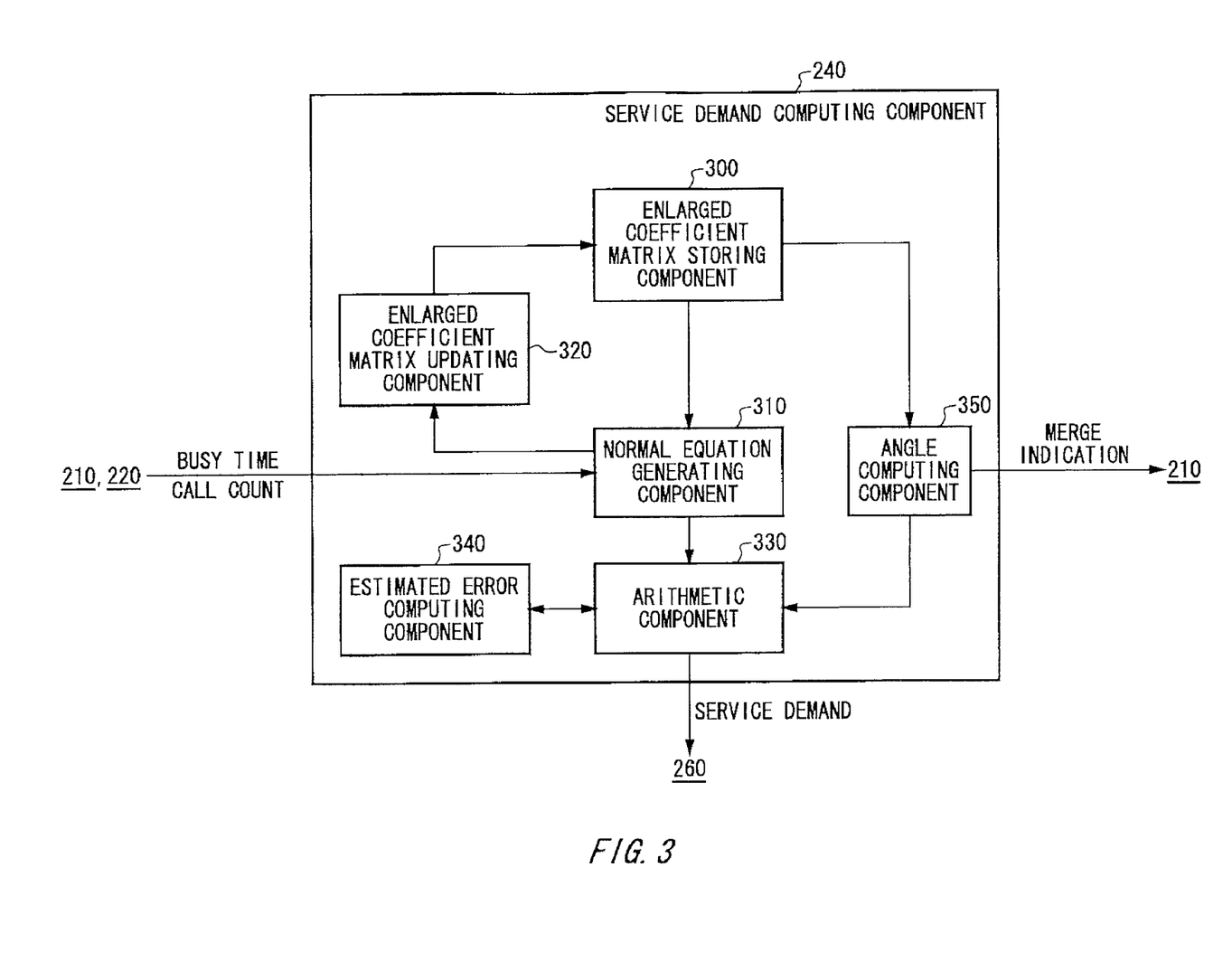
FIG. 3 is a view showing a functional configuration of a service demand computing component.

FIG. 3 shows a functional configuration of the service demand computing component 240. The service demand computing component 240 has an enlarged coefficient matrix storing component 300, a normal equation generating component 310, an enlarged coefficient matrix updating component 320, an arithmetic component 330, and an estimated error computing component 340. The enlarged coefficient matrix storing component 300 stores, for the plurality of observation periods already passed in the analysis period, a coefficient matrix of a variable vector showing the service demand and an enlarged coefficient matrix consisting of constant vectors calculated from a product of a vector showing the busy time for each observation period and a transposed matrix of a matrix obtained by inserting the call count for each service and each observation period in matrix elements defined by the intersections of the rows and columns of the matrix. When a communication packet is acquired for a new observation period, the normal equation generating component 310 generates a normal equation for the plurality of observation periods including this new observation period. This new normal equation is generated on the basis of the enlarged coefficient matrix stored on the enlarged coefficient matrix storing component 300, a busy time in this new observation period, and a call count for each service. In addition, this normal equation is an equation for calculating an average processing time that minimizes the sum of squares of an error.

The enlarged coefficient matrix updating component 320 updates the enlarged coefficient matrix storing component 300 on the basis of an enlarged coefficient matrix of the generated normal equation. Then, the arithmetic component 330 computes a service demand by solving the generated normal equation. The estimated error computing component 340 computes an estimated error for the service demand. The arithmetic component 330 outputs the computed service demand on condition that this estimated error satisfies a predetermined reference.

In this manner, the service demand computing component 240 computes a service demand by means of call count and a busy time newly obtained whenever an observation period passes. Then, the computed processing time is outputted if the estimated error satisfies a predetermined reference error (i.e., if the estimated error does not exceed the reference error). In this manner, since the computation of processing time can be completed at a time point at which adequate estimation precision is obtained, a time required for the computation can be shortened. Moreover, a computation process can be efficiently performed by utilizing a normal equation in a previous observation period.

In addition, the service demand computing component 240 may further have an angle computing component 350. The angle computing component 350 determines whether a plurality of services has relations dependent on each other in order to effectively compute an average processing time every service. For example, it is expected that a service for a login process and a service for a logout process are processed with the substantially the same number of times. Since the number of types of services becomes many when distinguishing such services, the efficiency of computation may deteriorate. Moreover, since a coefficient matrix of a normal equation does not become regular when distinguishing such services, the normal equation may not be solved. The angle computing component 350 computes an angle formed by a first vector showing the call count for each observation period for a first service and a second vector showing call the count for each observation period for a second service, in order to determine whether the plurality of services has a relation dependent on each other. If the formed angle is not more than a predetermined reference angle, the angle computing component 350 sends a merge indication showing that a service obtained by merging the first service and the second service is handled as a third service to the call count computing component 210 and the arithmetic component 330. The call count computing component 210 receives this, and sums the call count for the first service and the call count for the second service to compute a call count for the third service after the next observation period. Moreover, the arithmetic component 330 computes an average processing time for the third service in place of the first service and the second service. In this manner, if the angle computing component 350 is provided, it is possible to raise the efficiency of computation and prevent a computation inability state.

Figure 4:
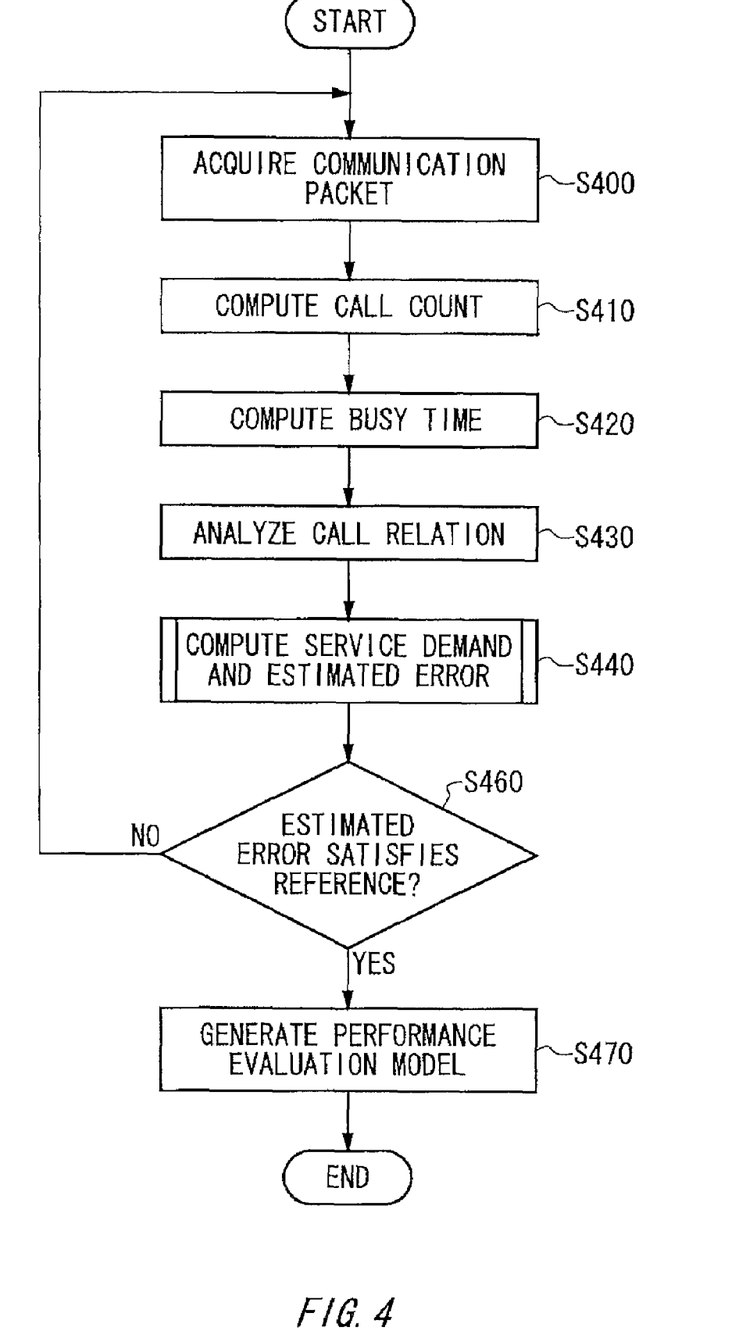
FIG. 4 is a view showing a flow of a process by which an analyzing apparatus generates a performance evaluation model.

FIG. 4 shows a flow of a process by which the analyzing apparatus 20 generates a performance evaluation model. The analyzing apparatus 20 performs the subsequent process for each observation period. First, the acquiring component 200 sequentially acquires, for each observation period, the plurality of communication packets mutually sent and received between the information processing apparatuses 110 within this observation period (S400). Next, whenever an observation period passes, the call count computing component 210 computes a service call count by which each of the information processing apparatuses 110 is called from the other information processing apparatuses 110 in the observation period (S410). Next, whenever an observation period passes, the busy time computing component 220 computes a busy time that is the sum of times for which the information processing apparatuses 110 executes a transaction in the observation period, in which the transaction is a process for a service (S420).

The call relation analyzing component 250 may analyze call relations for a service on the basis of the communication packet sent and received in this observation period (S430). In addition, this analysis may be performed only in, e.g., the first observation period instead of the lapse of every observation period. Moreover, as already described, call relations for a service may be previously prescribed.

Next, the service demand computing component 240 computes a service demand that is an average processing time for each service and the estimated error (S440). On condition that the estimated error exceeds a predetermined reference error (S460: NO), the process loops back to step S400 to perform steps S400-S460 for a next observation period. On condition that the estimated error does not exceed the predetermined reference error (S460: YES), the model generating component 260 generates a performance evaluation model on the basis of the service demand (S470) and the process of FIG. 4 ends. Thus, the process of FIG. 4 ends when the number of observation periods used to calculate the service demand (and the performance evaluation model dependent thereon) is sufficient to constrain the estimated error to within the predetermined reference error.

Subsequently, referring to FIG. 5, a process for computing a service demand will be described in detail. First, each parameter is defined in order to describe the process by means of a mathematical expression. An analysis period starts at time T, the length of observation period is $\Delta T_j$, and the number of observation periods included in the analysis period is m. Here, the observation periods are distinguished with a subscript j. An observation period j shows an observation period $\Delta T_j$ defined by the following Equation (1).

$$\left[T + \sum_{k=1}^{j-1} \Delta T_k, T + \sum_{k=1}^{j} \Delta T_k\right] \qquad \text{Equation (1)}$$

Let a busy time computed by the busy time computing component 220 for the observation period j be denoted by $b_j$. Moreover, let a call count for each service i computed by the call count computing component 210 in the observation period j be denoted by $a_{ji}$. Here, i denotes a type of a service ($1 \leq i \leq n$). Moreover, let an average processing time (i.e., service demand) for the service i be denoted by an unknown variable $d_i$ which will be computed as explained infra. Under the above definitions, a relation in the observation period j between a busy time $b_j$, a call count $a_{ji}$ for service i, and a service demand $d_i$ for service i is as follows.

$$b_j = \sum_i a_{ji} d_i + \varepsilon_j \qquad \text{Equation (2)}$$

Here, $\varepsilon_j$ shows a difference between the busy time and the sum of values obtained by multiplying the call count for each service and an average processing time for this service. This difference is equivalent to an observation error of the busy time. Moreover, it is considered that the $\varepsilon_j$ satisfies $<\varepsilon_j>=0$ and $<\varepsilon_i\varepsilon_j>=\sigma^2\delta_{ij}$. Moreover, $<\ >$ shows an ensemble mean, $\sigma$ shows a standard deviation of an observation error, and $\delta_{ij}$ shows Kronecker's delta. If a service demand minimizing the sum of squares of such observation error $\varepsilon_j$ can be effectively calculated, a performance evaluation model can be computed with high precision, which means determining $d_i$ (i=1, 2, ..., n) subject to minimizing $\Sigma_j(\varepsilon_j)^2$, wherein $\varepsilon_j=(b_j-\Sigma_i a_{ji} d_i)$, wherein $\Sigma_i$ represents a summation over i from i=1 to i=n, wherein $\Sigma_j$ represents a summation over j from j=1 to j=m, wherein n is the total number of provided services, and wherein m is the total number of observation periods.

Figure 5:
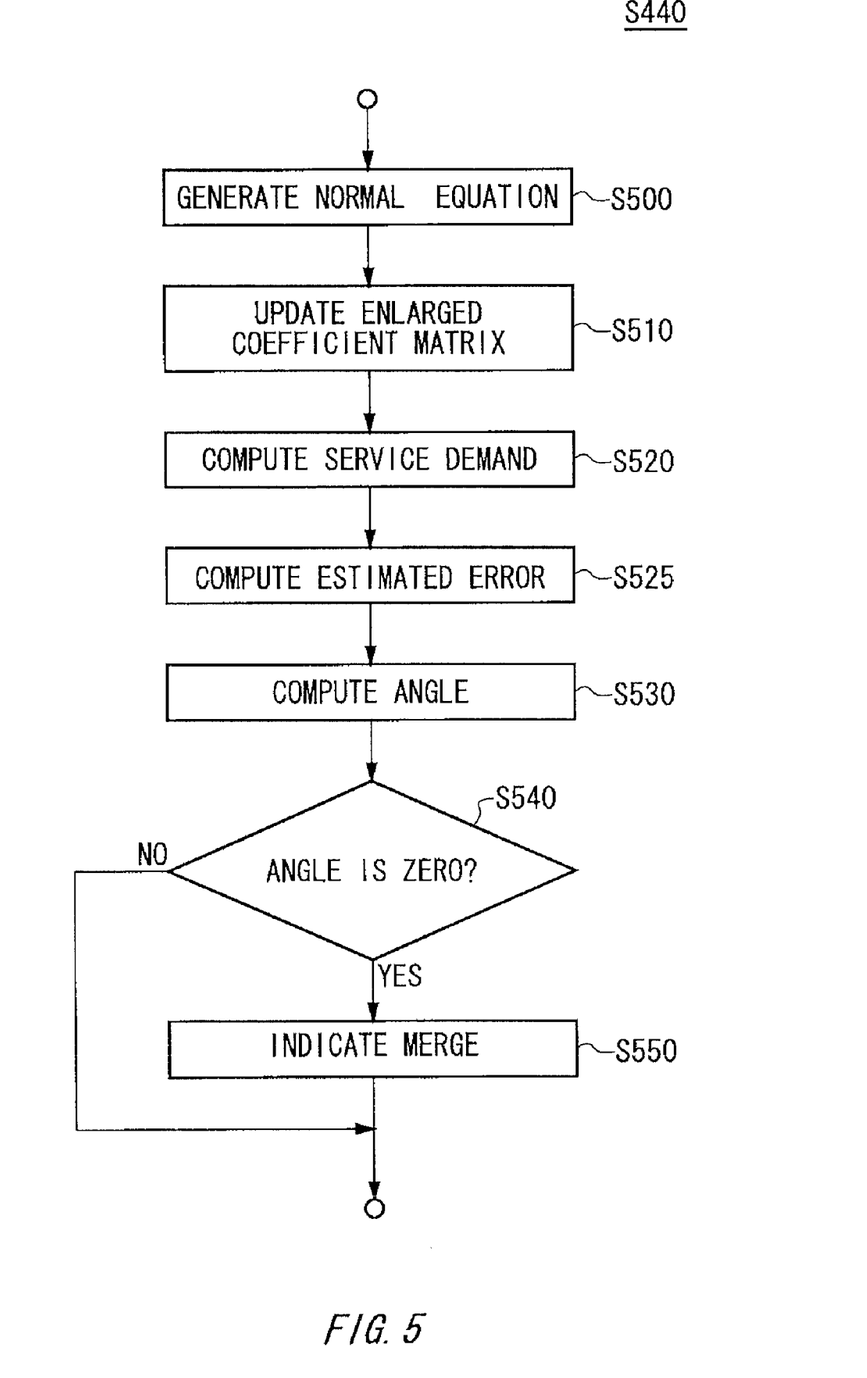
FIG. 5 is a view showing the detailed process of S440 shown in FIG. 4.

FIG. 5 shows the detailed process of S440 shown in FIG. 4. First, the normal equation generating component 310 generates a normal equation for calculating an average processing time minimizing the sum of squares of an error in each observation period (S500). This normal equation is an expression obtained by expressing a product of a matrix A obtained by inserting the call count $a_{ji}$ for each service i and every observation period j in matrix elements defined by the intersection (j, i) of the row j and column i of the matrix A, and a transposed matrix $A^t$ of the matrix A as a coefficient matrix of a variable vector (d) showing the average processing time for each service (i.e., the coefficient matrix is $A^t A$). Moreover, this normal equation is an expression obtained by using a vector calculated by a product of a vector showing a busy time (b) for each observation period and the transposed matrix as a constant vector. The normal equation is illustrated in Equation (3).

$$A^t A d = A^t b \qquad \text{Equation (3)}$$

Here, a j-row and i-column component in a matrix A is $a_{ji}$. Moreover, the variable vector d is $(d_1, \ldots, d_n)^t$, and the vector b is $(b_1, \ldots, b_m)^t$.

The normal equation generating component 310 uses an enlarged coefficient matrix stored on the enlarged coefficient matrix storing component 300 in order to effectively generate this normal equation.

The coefficient matrix and the constant vector for the normal equation generated for the plurality of observation periods already passed are stored on the enlarged coefficient matrix storing component 300. In case that a newly passed observation period is a observation period m, a coefficient matrix for the normal equation generated from a observation period 1 to a observation period m−1 is stored on the enlarged coefficient matrix storing component 300. A component $x_{ij}$ that is (i, j) component of a coefficient matrix X, which is equal to $A^t A$, for a normal equation to be newly calculated is expressed by the following Equation (4).

$$x_{ij} = \sum_{k=1}^{m} a_{ki} a_{kj} = \sum_{k=1}^{m-1} a_{ki} a_{kj} + a_{mi} a_{mj} \qquad \text{Equation (4)}$$

According to Equation (4), the coefficient matrix $A^t A$ in the observation period m is expressed on the basis of the coefficient matrix already generated from the observation period 1 to the observation period m−1 and the call count newly computed in the observation period m.

Similarly, a component $c_i$ that is a first component of a constant vector $A^t b$ of the newly calculated normal equation is expressed by the following Equation (5).

$$c_i = \sum_{k=1}^{m} a_{ki} b_k = \sum_{k=1}^{m-1} a_{ki} b_k + a_{mi} b_m \qquad \text{Equation (5)}$$

According to Equation (5), the constant vector $A^t b$ in the observation period m is expressed on the basis of the constant vector already generated from the observation period 1 to the observation period m−1 and the call count newly computed in the observation period m.

Thus, the normal equation generating component 310 can compute a new normal equation by performing an arithmetical operation on each component of the enlarged coefficient matrix already generated from the observation period 1 to the observation period m−1 and the call count and busy time newly computed in the observation period m according to Equations (4) and (5).

The enlarged coefficient matrix updating component 320 updates an enlarged coefficient matrix stored on the enlarged coefficient matrix storing component 300 on the basis of the enlarged coefficient matrix in the generated normal equation (S510).

The arithmetic component 330 computes a service demand minimizing the sum of squares of an error by means of solving this normal equation (S520). Since a solution for the normal equation has been conventionally known by various methods such as a Gauss-Jordan method, LU decomposition, QR decomposition, or singular value decomposition and the realization method, its description is omitted.

Next, the estimated error computing component 340 computes a diagonal component of an inverse matrix as an estimated error for a service demand for the coefficient matrix $A^t A$ of the variable vector showing the service demand in the generated normal equation (S525). A diagonal component $x_{ii}^{-1}$ shows an estimated error of a service demand for a service i.

Next, the angle computing component 350 computes an angle formed by vectors showing the call count for each service in order to determine whether the plurality of services has dependent relations (S530). For example, the angle computing component 350 computes an angle formed by a first vector ($V_1$) showing call counts for each observation period for a first service and a second vector ($V_2$) showing call counts for each observation period for a second service among the plurality of services. The formed angle θ is computed on the basis of an inner product ($V_1 \cdot V_2$) of the first vector $V_1$ and the second vector $V_2$ and the length $|V_1|$ of the first vector and the length $|V_2|$ second vector (i.e., θ is an inverse cosine of $V_1 \cdot V_2/(|V_1||V_2|)$. The inner product is given as each component of the coefficient matrix $A^t A$. Moreover, the length of vector is given as a square root of a diagonal component of the coefficient matrix $A^t A$. That is to say, the angle computing component 350 can compute an angle formed by each vector and each of the other vectors on the basis of each component of the coefficient matrix stored on the enlarged coefficient matrix storing component 300. For example, the angle θ between call count vectors for services p and q ($1 \leq p \leq n$, $1 \leq q \leq n$, and $p \neq q$) is equal to an inverse cosine of $\{x_{pq}/((x_{pp})(x_{qq}))^{1/2}\}$, wherein $X = A^t A$.

On condition that the computed angle is not more than a predetermined reference angle (for example, the reference angle may be substantially zero degrees) (S540: YES), the angle computing component 350 sends merge indication showing handling as one new service by merging the plurality of services. In order to appropriately merge services in the subsequent observation periods, it is necessary to update the enlarged coefficient matrix stored on the enlarged coefficient matrix storing component 300. The updating process will be described next.

First, it is considered that the first service to be merged is a service p and the second service is a service q. These services p and q are merged and then the merged service is handled as a third service r. In a certain observation period k, a relation referred to as $a_{kr} = a_{kp} + a_{kq}$ is formed between call count $a_{kp}$ of the service p, call count $a_{kq}$ of the service q, and call count $a_{kr}$ of the service r.

Here, $x_{ir}$ is the (i, r) ($1 \leq i$, $r \leq n$) component of the coefficient matrix $A^t A$ stored on the enlarged coefficient matrix storing component 300 is expressed as the following Equation (6).

$$x_{ir} = \sum_{k=1}^{m} a_{ki} a_{kr} = \sum_{k=1}^{m} a_{ki}(a_{kp} + a_{kq}) = x_{ip} + x_{iq} \qquad \text{Equation (6)}$$

Thus, $x_{ir}$ is expressed as a linear sum of components of the coefficient matrix related to a service to be merged. According to this investigation, the enlarged coefficient matrix updating component 320 may sum each component $x_{ip}$ of a p-th row vector and each component $x_{iq}$ of a q-th row vector in a coefficient matrix of a variable vector showing a service demand in a normal equation to generate a new row vector $x_{ir}$, and include the new row vector in a new coefficient matrix and store it on the enlarged coefficient matrix storing component 300.

Furthermore, since this coefficient matrix $A^t A$ is a symmetric square matrix, $x_{ri} = x_{pi} + x_{qi}$ is similarly realized. Therefore, the enlarged coefficient matrix updating component 320 may similarly sum each component $x_{pi}$ of the pth column vector and each component $x_{qi}$ of the qth column vector in the coefficient matrix in order to generate a new column $x_{ri}$, and include the new column in a new coefficient matrix to store it on the enlarged coefficient matrix storing component 300.

An operation by the enlarged coefficient matrix updating component 320 described above is expressed as transform from Equation (7) to Equation (8).

$$X = \begin{pmatrix} x_{11} & \cdots & x_{1p} & \cdots & x_{1q} & \cdots & x_{1n} \\ \vdots & \cdots & \vdots & \cdots & \vdots & \cdots & \vdots \\ x_{p1} & \cdots & x_{pp} & \cdots & x_{pq} & \cdots & x_{pn} \\ \vdots & \cdots & \vdots & \cdots & \vdots & \cdots & \vdots \\ x_{q1} & \cdots & x_{qp} & \cdots & x_{qq} & \cdots & x_{qn} \\ \vdots & \cdots & \vdots & \cdots & \vdots & \cdots & \vdots \\ x_{n1} & \cdots & x_{np} & \cdots & x_{nq} & \cdots & x_{nn} \end{pmatrix} \qquad \text{Equation (7)}$$

$$X' = \begin{pmatrix} x_{11} & \cdots & x_{1r} & \cdots & x_{1n} \\ \vdots & \cdots & \vdots & \cdots & \vdots \\ x_{r1} & \cdots & x_{rr} & \cdots & x_{rn} \\ \vdots & \cdots & \vdots & \cdots & \vdots \\ x_{n1} & \cdots & x_{nr} & \cdots & x_{nn} \end{pmatrix} \qquad \text{Equation (8)}$$

The similar result is obtained about a constant vector calculated from a product of a vector (b) showing a busy time and a transposed matrix $A^t$. Assuming that each component of a constant vector calculated from a product of a vector showing a busy time every observation period already passed and a transposed matrix of a matrix obtained by arranging the call count every service and every observation period in row and column is $c_i$, the rth component $c_r$ is calculated by a linear sum of the p-th component $c_p$ and the q-th component $c_q$ (see Equation (9)).

$$c_r = \sum_{k=1}^{m} a_{kr} b_k = \sum_{k=1}^{m} (a_{kp} + a_{kq}) b_k = c_p + c_q \qquad \text{Equation (9)}$$

Thus, the enlarged coefficient matrix updating component 320 may sum the p-th component $c_p$ and the q-th component $c_q$ in the constant vector calculated from the product of the vector showing the busy time and the transposed matrix in order to generate the new component $c_r$, and include the new component in the new vector to store it on the arithmetic component 330.

According to the above process, although services are merged during analyzing the performance, the enlarged coefficient matrix updating component 320 updates an enlarged coefficient matrix through few additional computation to prepare for the next observation period.

Figure 6:
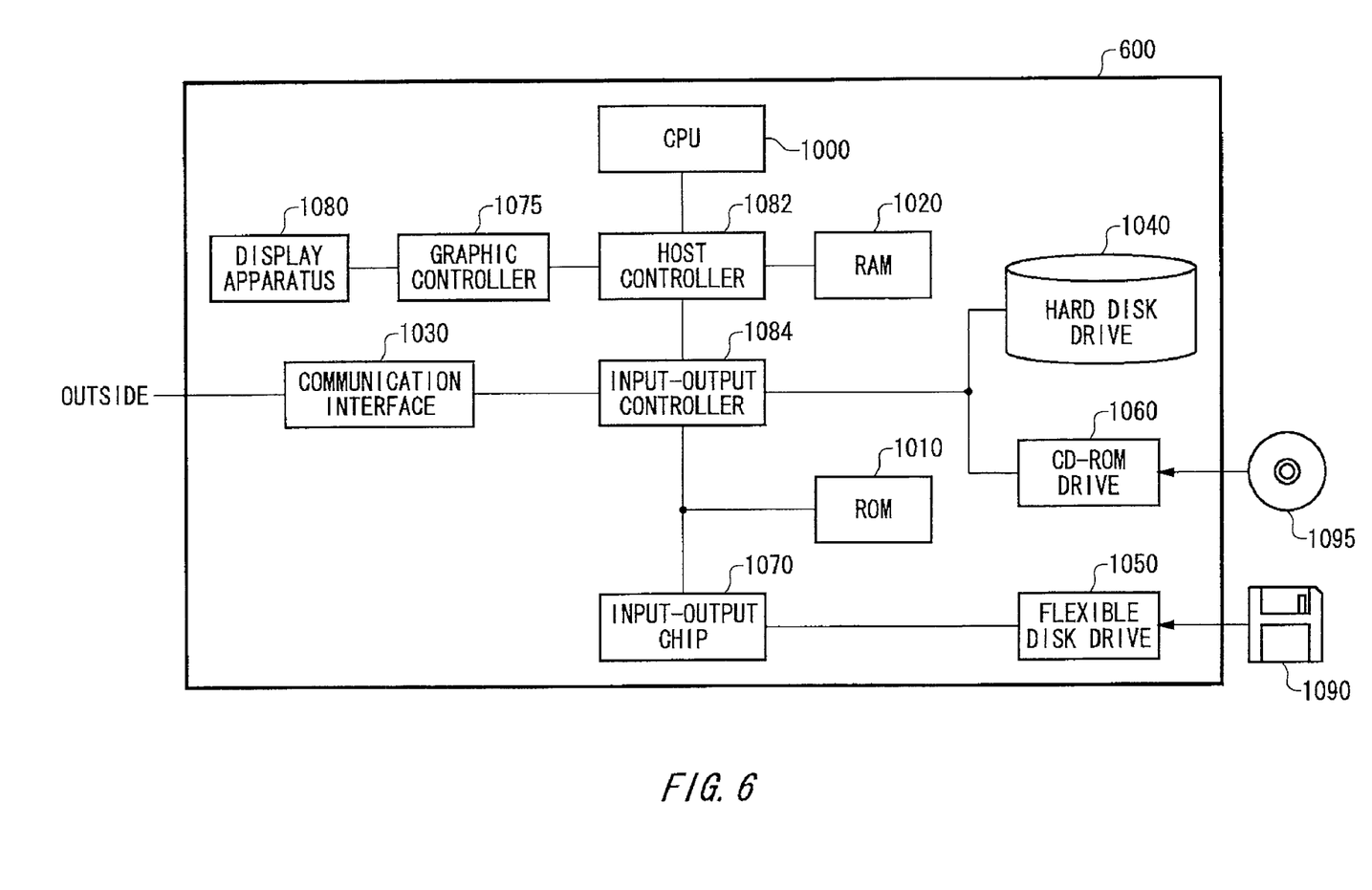
FIG. 6 is a view exemplary showing a hardware configuration of a computer functioning as an analyzing apparatus.

FIG. 6 exemplary shows a hardware configuration of a computer 600 functioning as the analyzing apparatus 20. The computer 600 includes a CPU peripheral component having a CPU 1000, a RAM 1020, and a graphic controller 1075 that are connected to one another by a host controller 1082, an input-output component having a communication interface 1030, a hard disk drive 1040, and a CD-ROM drive 1060 that are connected to the host controller 1082 by an input-output controller 1084, and a legacy input-output component having a ROM 1010, a flexible disk drive 1050, and an input-output chip 1070 that are connected to the input-output controller 1084.

The host controller 1082 connects the RAM 1020 to the CPU 1000 and the graphic controller 1075 for accessing the RAM 1020 at high transfer rate. The CPU 1000 operates based on a program stored on the ROM 1010 and the RAM 1020 to control each component. The graphic controller 1075 acquires image/output data generated by the CPU 1000 on a frame buffer provided in the RAM 1020, and displays the image/output data on the display apparatus 1080. Alternatively, the graphic controller 1075 may include therein the frame buffer for storing the image/output data generated from the CPU 1000.

The input-output controller 1084 connects the host controller 1082 to the communication interface 1030, the hard disk drive 1040, and the CD-ROM drive 1060 that are a comparatively fast input-output apparatus. The communication interface 1030 communicates with outside devices via a network. The hard disk drive 1040 stores a program and input/output data to be used/generated by the computer 600. The CD-ROM drive 1060 reads a program or data from a CD-ROM 1095, and provides the program or data to the RAM 1020 or the hard disk drive 1040.

The output data that may be displayed by the display apparatus 1080 and/or stored on the hard disk drive 1040 may comprise, inter alia, the computed average processing times ($d_i$), the computed errors ($\epsilon_j$), the matrix A, the transposed matrix $A^t$, the coefficient matrix $X = A^t A$, the merged coefficient matrix $X'$ (see Equation (8)), output from executing the performance evaluation model (e.g., queueing model or a discrete event simulator), etc.

Moreover, the ROM 1010, the flexible disk drive 1050, and the input-output chip 1070 that are a comparatively low-speed input-output apparatus are connected to the input-output controller 1084. The ROM 1010 stores a boot program to be executed by the CPU 1000 during starting the computer 600, a program dependent on hardware of the computer 600, or the like. The flexible disk drive 1050 reads a program or data from a flexible disk 1090, and provides the program or data to the RAM 1020 or the hard disk drive 1040 via the input-output chip 1070. The input-output chip 1070 connects various kinds of input-output devices via the flexible disk 1090, a parallel port, a serial port, a keyboard port, a mouse port, or the like.

A program provided to the computer 600 is stored on a recording medium such as the flexible disk 1090, the CD-ROM 1095, or an IC card in order to be provided by a user. The program is read from the recording medium via the input-output chip 1070 and/or the input-output controller 1084 to be installed and executed in the computer 600. Since operations performed by working on the computer 600 or the like by the program are the same as those by the analyzing apparatus 20 described in FIGS. 1 to 5, their descriptions will be omitted.

A program described above may be stored on an outside storage medium. A storage medium can include an optical recording medium such as a DVD and a PD, a magneto-optical recording medium such as an MD, a tape medium, a semiconductor memory such as an IC card in addition to the flexible disk 1090 and the CD-ROM 1095. Moreover, a storage device such as a hard disk or RAM provided in a server system connected to a private communication network and Internet may be used as a recording medium to provide a program to the computer 600 via a network.

As above, according to the analyzing apparatus 20 of the present embodiment, it is possible to support the determination for a configuration change by analyzing the performance of the information processing system 10 because each of the information processing apparatuses 110 estimates a time required for a process of a service. Moreover, since copy data of a communication packet acquired from the communication apparatus 100 are used for the analysis of performance, it is possible to continue operations of the information processing system 10 without having an influence on operations during analyzing the performance. Furthermore, since a service demand is computed along with the precision whenever an observation period passes, the process can be terminated before all analysis periods pass in case that adequate precision is obtained. Moreover, since only a necessary coefficient matrix is stored on the enlarged coefficient matrix storing component 300 without recording all call count during analysis, it is possible to reduce necessary capacitance of the RAM 1020 or the like provided in the analyzing apparatus 20 and thus reduce cost.

Although the present invention has been described by way of exemplary embodiments, it should be understood that those skilled in the art might make many changes and substitutions without departing from the spirit and the scope of the present invention which is defined only by the appended claims.

What is claimed is:

1. An analysis method for analyzing an information processing system having a plurality of information processing apparatuses providing services to each other by an analyzer, comprising the steps of:

acquiring a plurality of communication packets sent or received between the apparatuses during a specified analysis period as an analysis subject by the analyzer;

computing a service call count called wherein each of the information processing apparatuses in the plurality of information processing apparatuses is called by another information processing apparatus in the plurality of information processing apparatuses, based upon the communication packet acquired by the analyzer during a divided period;

computing a busy time, which is a sum of a time period where the plurality of information processing apparatuses execute a transaction, which is service processing, by the analyzer per divided period; and computing an average processing time wherein a sum of square of a difference between the busy time for each divided period and a number of calls per service during the divided period multiplied by the average processing time of transaction for processing the service is minimized per service by the analyzer.

* * * * *